(12) United States Patent
Liu et al.

(10) Patent No.: US 6,736,627 B2
(45) Date of Patent: May 18, 2004

(54) MOLD CLEANING APPARATUS

(75) Inventors: Jie Liu, Singapore (SG); Zhen Rong Huang, Singapore (SG); Shu Chuen Ho, Singapore (SG); Chin Guan Ong, Singapore (SG); Teng Hock Kuah, Singapore (SG)

(73) Assignee: ASM Technology Singapore Pte. Ltd., Singapore (SG)

( * ) Notice: Subject to any disclaimer, the term of this patent is extended or adjusted under 35 U.S.C. 154(b) by 187 days.

(21) Appl. No.: 09/901,256

(22) Filed: Jul. 9, 2001

(65) Prior Publication Data
US 2003/0008027 A1 Jan. 9, 2003

(51) Int. Cl.$^7$ .............................................. B29C 45/02
(52) U.S. Cl. ...................... 425/225; 425/116; 425/226; 425/229
(58) Field of Search ................................ 425/225, 226, 425/229, 116

(56) References Cited

U.S. PATENT DOCUMENTS 4,821,576 A * 4/1989 Miura et al. ................ 425/225
6,071,107 A * 6/2000 Harmsen et al. ............ 425/116

FOREIGN PATENT DOCUMENTS

| EP | 0 817 245 A1 | 7/1998 |
|---|---|---|
| JP | 05-192741 | 8/1993 |
| JP | 07-156157 | 6/1995 |
| JP | 11-151722 | 6/1999 |
| JP | 11-168115 | 6/1999 |
| JP | 11-198151 | 7/1999 |
| JP | 11-291295 | 10/1999 |

* cited by examiner

Primary Examiner—Tim Heitbrink
(74) Attorney, Agent, or Firm—Ostrolenk, Farber, Gerb & Soffen, LLP

(57) ABSTRACT

Mold cleaning apparatus (1) includes a manifold (5) adapted to be coupled to a suction device. A first conduit (6) extends from the manifold (5) and has a first opening (8) remote from the manifold. A second conduit (7) extends from the manifold (5) and has a second opening (11) remote from the manifold (5). The first and the second openings (8, 11) being directed in opposite directions, and the first conduit (6) having a section (10) with a cross-sectional area which is less than cross-sectional area at any point along the length of the second conduit (7).

12 Claims, 2 Drawing Sheets

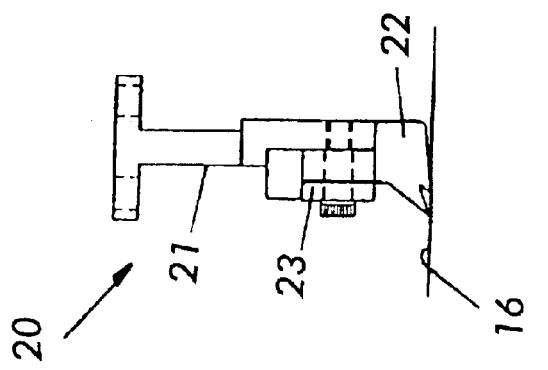
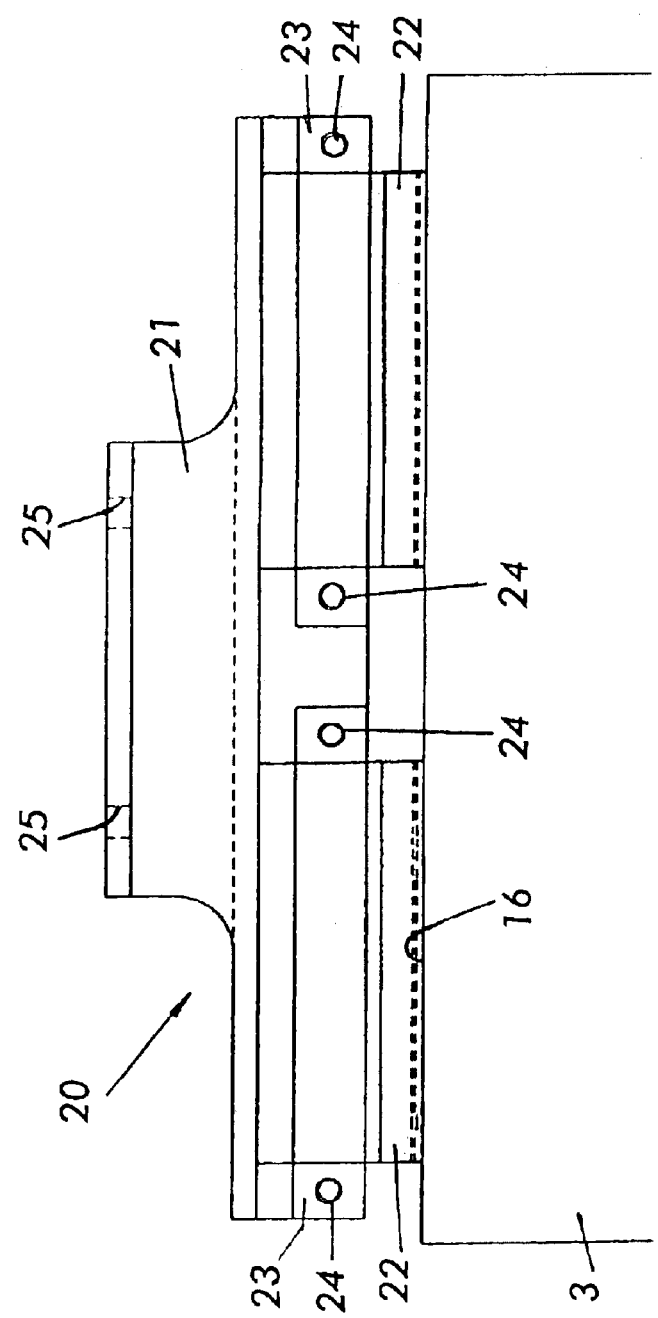

MOLD CLEANING APPARATUS

FIELD OF THE INVENTION

The invention relates to mold cleaning apparatus.

BACKGROUND TO THE INVENTION

After molding of epoxy resin material around a semiconductor chip and substrate, it is important to clean the mold halves before inserting the next substrate and semiconductor chip into the mold. Mold cleaning is important to ensure that foreign particles left on the mold cavities after the previous molded package have been removed and do not cause imperfections in subsequent molded packages.

Normally, the molding apparatus includes a first robotic carriage, commonly known as the on-loader carriage, which loads a substrate and semiconductor chip into the mold and a second robotic carriage, commonly known as the off-loader carriage, to remove the molded substrate and semiconductor chip from the mold. The mold cleaning is normally performed by a cleaning device which is mounted on the off-loader and which cleans the mold halves as the molded substrate and semiconductor chip are removed from the mold. After the mold halves have been cleaned by the off-loader carriage, the on-loader carriage then loads the next substrate and semiconductor chip to be molded into the mold.

One of the cleaning devices which is normally used to clean the mold halves is a suction device which sucks loose debris from both the upper and lower mold surfaces. The suction cleaning device normally includes an upper suction port, which engages with the upper mold half, and a lower suction port which engages with the lower mold half so that the upper and lower mold halves are cleaned simultaneously.

However, due to the influence of gravity, the majority of the mold debris accumulates on the lower mold half surface but it is easier to remove debris from the upper mold halves surface as gravity assists the removal of the mold debris from the upper mold halves. Hence, the conventional suction device has the disadvantage that it operates more efficiently in cleaning mold debris from the upper mold half but that the majority of the mold debris is located on the lower mold half.

SUMMARY OF THE INVENTION

In accordance with a first aspect of the present invention, there is provided mold cleaning apparatus compromising a manifold adapted to be coupled to a suction device, a first conduit extending from the manifold and having a first opening remote from the manifold, and a second conduit extending from the manifold and having a second opening remote from the manifold, the first and the second openings being directed in opposite directions, and the first conduit having a section with a cross-sectional area which is less than cross-sectional area at any point along the length of the second conduit Preferably, the first opening is adapted to engage an upper mold surface of a mold and the second opening is adapted to engage a lower mold surface of a mold.

Preferably, the apparatus further comprises fluid injection means coupled to the second conduit, adjacent to the second opening, to inject fluid into the opening of the second conduit. Preferably, the fluid injection means is mounted on the second conduit to inject fluid towards the lower mold surface when the second opening is engaged with the lower mold surface.

Preferably, the apparatus comprises two manifolds and a conduit extends from each manifold to the first opening and from each manifold to the second opening.

Preferably, the first and the second openings each comprise a flexible member which is adapted to engage with the respective mold surface. Typically, the flexible member is an elastically deformable member.

In accordance with a second aspect of the present invention, there is provided a mold for molding a material around a semiconductor chip and a substrate on which the semiconductor chip is mounted, the mold comprising a lower mold half and an upper mold half, the mold halves being movable between an open position, in which a substrate and a semiconductor chip mounted thereon can be inserted into the mold halves and a molded substrate and semiconductor chip can be removed from the mold halves, and a closed position, in which a molding operation can be performed; a first movable carriage adapted to insert a substrate and a semiconductor chip mounted thereon into the mold; a second carriage adapted to remove a molded substrate and semiconductor chip from the mold, a first mold cleaning device mounted on the first carriage to clean a surface of the mold halves before a substrate and a semiconductor chip are placed in the mold; and a second cleaning device mounted on the second carriage to clean the mold halves after a molded substrate and semiconductor chip is removed from the mold.

Typically, the first cleaning device may comprise a brush and/or fabric which engages with a surface of the mold halves during cleaning.

Preferably, the first cleaning device cleans the lower mold half.

Preferably, the second mold cleaning device comprises a mold cleaning apparatus in accordance with the first aspect of the present invention.

BRIEF DESCRIPTION OF THE DRAWINGS

An example of mold cleaning apparatus in accordance with the invention will now be described with reference to the accompanying drawings in which:

FIG. 3 is a front view of a brush type mold cleaning device; and

FIG. 4 is a side view of the brush type mold cleaning device.

DETAILED DESCRIPTION OF PREFERRED EMBODIMENTS

Figure 2:
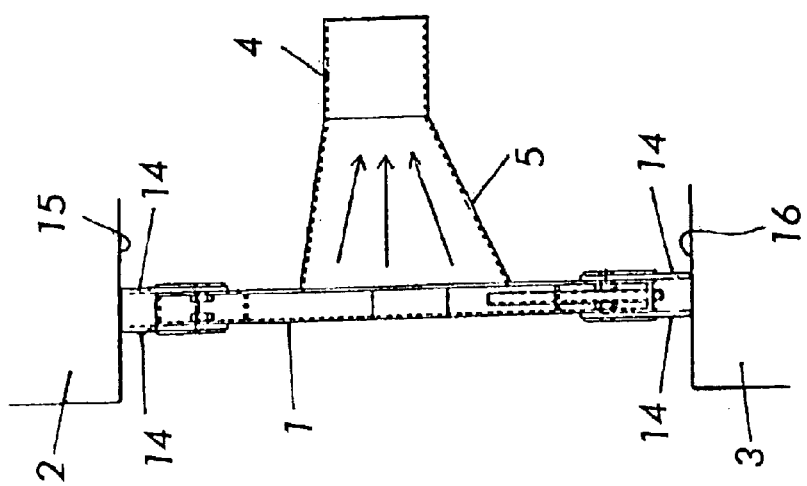
FIG. 2 is a side view of the suction mold cleaning device as shown in FIG. 1.
Figure 1:
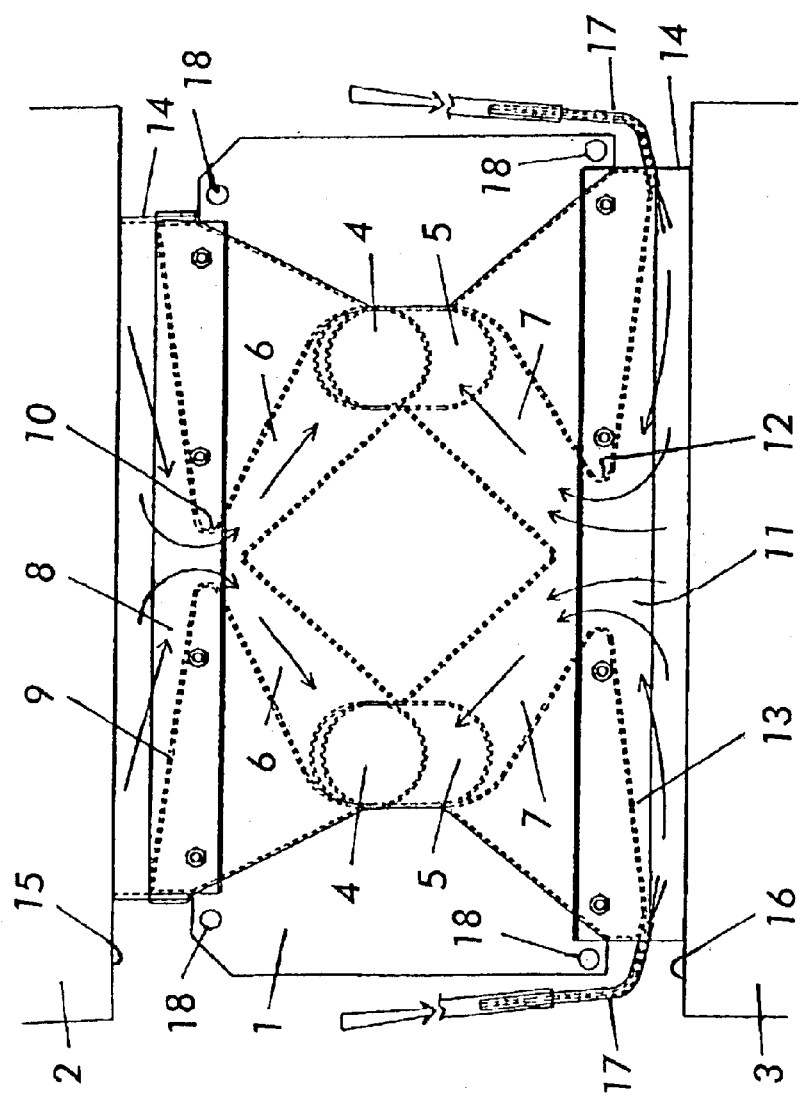
FIG. 1 is a front view of a suction mold cleaning device.

FIGS. 1 and 2 show a suction device 1 located between an upper mold half 2 and a lower mold half 3. The suction device 1 includes two outlets 4 which are adapted to be coupled to a vacuum pump (not shown). The outlets 4 are each coupled to a manifold 5. From each manifold 5 extends an upper fluid channel 6 and a lower fluid channel 7. The upper fluid channels 6 merge with each other at an opening 8 which comprises a funnel section 9 and a neck section 10 between the funnel section 9 and the channels 6.

Similarly, the lower fluid channels 7 meet at a lower opening 11 which includes a neck section 12 and a funnel section 13. The neck section 12 is located between the funnel section 13 and the lower fluid channel 7. Attached to each side of the openings 8, 11 are rubber strips 14 which extend along the sides of the openings 8, 11. The edges of the rubber strips 14 engage with surfaces 15, 16 of the upper and lower mold halves 2, 3.

The suction device 1 also includes compressed air injection tubes 17 mounted at, or adjacent to, the lower opening 11. The air injection tubes 17 are directed inwardly towards the neck section 12 and downwardly towards the surface 16 of the lower mold half 3.

The suction device 1 also includes mounting holes 18 to enable the suction device 1 to be mounted on a robotic off-loader carriage (not shown) of the molding equipment.

It should be noted that the neck section 12 has a larger cross-sectional area than the neck section 10. Therefore, when the outlets 4 are connected to a vacuum pump (not shown), there is a greater air flow through the opening 11 than through the opening 8. The air flow through the opening 11 is also enhanced by the compressed air injection tubes 17 which direct compressed air inwardly towards the neck section 12 and against the lower surface 16 of the mold half 3.

FIGS. 3 and 4 show a brush type cleaning device 20 which includes a body member 21 to which two silicon rubber brushes 22 are attached by a clamp member 23. The clamp member 23 clamps the brushes 22 to the body member 21 by screws 24, or any other suitable fastening device. The body member 21 also includes mounting holes 25 which enable the cleaning device 20 to be mounted on a robotic on-loader carriage (not shown) of the mold equipment.

As an alternative to, or in addition to, the silicon brushes 22, the cleaning device 20 may comprise a cleaning cloth, such as a lint-free cleaning cloth.

In use, the suction device 1 is mounted on an off-loader carriage of the molding equipment and the outlets 4 are attached to a vacuum pump. The cleaning device 20 is mounted on an on-loader carriage.

Prior to carrying out a molding operation on a substrate and semiconductor chip mounted on a substrate, the mold halves 2, 3 are moved to the open position and the on-loader carriage is inserted between the mold halves so that the silicon brushes 22 slide against the lower surface 16 of the lower mold half 3 to clean the surface 16. When the on-loader carriage is fully inserted between the mold halves 2, 3 the on-loader carriage deposits the substrate and semiconductor chip on the lower mold half 3. The on-loader carriage then moves the cleaning device 20 upward so that the brushes move out of engagement with the surface 16 and the on-loader carriage is withdrawn from between the mold halves 2, 3.

The mold halves 2, 3 are then closed and a molding operation is performed to mold an epoxy resin material around the semiconductor chip and the substrate.

After the molding operation has been completed, the mold halves 2, 3 are moved to the open position and the off-loader carriage is inserted between the mold halves 2, 3. The off-loader carriage picks up the molded substrate and semiconductor chip from the lower mold half and the suction device 1 is engaged with the upper and lower mold halves 2, 3 so that the rubber strips 14 engage with the surfaces 15, 16. The vacuum pump is then activated to draw air through the openings 8, 11 and the compressed air source is activated to inject compressed air through the air injection tubes 17. As the off-loader carriage is withdrawn from the mold halves 2, 3 the suction device 1 is drawn across the surfaces 15, 16 and foreign particles and debris on the mold surfaces 15, 16 are sucked off the mold surfaces 15, 16 by the suction device 1.

After the off-loader carriage has been completely removed between the mold halves 2, 3 and the suction device 1 is removed from between the mold halves, the vacuum pump is switched off and the off-loader carriage is moved away from the mold halves 2, 3 to permit the on-loader carriage to move to the mold halves 2, 3 to insert another substrate and semiconductor chip to be molded.

By providing the suction device 1 with a larger lower neck section 12, permits more air flow to be extracted through the lower opening 11 than through the upper opening 8. The higher air flow through the lower opening 11 enables more efficient cleaning of the lower mold surface 16 to take into account that the majority of the debris is normally located on the lower mold surface 16 and that gravity hinders removal of foreign particles and debris from the lower mold surface 16.

In addition, the use of air injection adjacent to the lower opening also enhances removal of debris and foreign particles from the lower surface 16.

The invention also has the advantage that by providing a mold cleaning device on the on-loader, the lower mold surface is cleaned again immediately prior to insertion of the substrate and the semiconductor chip into the mold.

In addition, it is possible that the brush type cleaning device 20 could be mounted on the on-loader so as to clean the upper mold half during insertion of the on-loader carriage between the mold halves 2, 3, or that two brush type devices 20 could be mounted on the on-loader so that both the surface 10 and the surface 16 are cleaned simultaneously as the on-loader carriage is inserted between the mold halves 2, 3.

We claim:

1. Mold cleaning apparatus comprising a manifold adapted to be coupled to a suction device, a first conduit extending from the manifold and having a first opening remote from the manifold, and a second conduit extending from the manifold and having a second opening remote from the manifold, the first and the second openings being directed in opposite directions, and the first conduit having a section with a cross-sectional area which is less than a cross-sectional area at any point along the length of the second conduit.

2. Apparatus according to claim 1, wherein the first opening is adapted to engage an upper mold surface of a mold and the second opening is adapted to engage a lower mold surface of a mold.

3. Apparatus according to claim 2, wherein the first and the second openings each comprise a flexible member which is adapted to engage with the respective mold surface.

4. Apparatus according to claim 3, wherein the flexible members are elastically deformable.

5. Apparatus according to claim 1, further comprising fluid injection means coupled to the second conduit, adjacent to the second opening, to inject fluid into the opening of the second conduit.

6. Apparatus according to claim 5, wherein the first opening is adapted to engage an upper mold surface of a mold and the second opening is adapted to engage a lower mold surface of a mold, and the fluid injection means is mounted on the second conduit to inject fluid towards the lower mold surface when the second opening is engaged with the lower mold surface.

7. Apparatus according to claim 1, further comprising another manifold, a third conduit extending from the other manifold to the first opening and a fourth conduit extending from the other manifold to the second opening.

8. Molding apparatus for molding a material around a semiconductor chip and a substrate on which the semiconductor chip is mounted, the mold comprising a lower mold half and an upper mold half, the mold halves being movable between an open position, in which a substrate and a semiconductor chip mounted thereon can be inserted into the mold halves and a molded substrate and semiconductor chip an be removed from the mold halves, and a closed position, in which a molding operation can be performed, a cleaning device to clean a surface of the mold halves before a substrate and a semiconductor chip are placed in the mold; and a suction device coupled to a manifold to clean the mold halves after a molded substrate and said semiconductor chip are removed from the mold a first conduit extending from the manifold and having a first opening remote from the manifold, and a second conduit extending from the manifold and having a second opening remote from the manifold, the first and the second openings being directed in opposite directions, and the first conduit having a section with a cross-sectional area which is less than a cross-sectional area at any point along the length of the second conduit.

9. Apparatus according to claim 8, wherein the cleaning device comprises a brush which engages with a surface of the mold halves during cleaning.

10. Apparatus according to claim 8, wherein the cleaning device comprises a fabric material which engages with a surface of the mold halves during cleaning.

11. Apparatus according to claim 8, wherein the cleaning device is adapted to clean the lower mold half.

12. Apparatus according to claim 9, wherein the cleaning device comprises a fabric material which engages with a surface of the mold halves during cleaning.

* * * * *